United States Patent
Masui et al.

(10) Patent No.: US 11,087,493 B2
(45) Date of Patent: Aug. 10, 2021

(54) DEPTH-IMAGE PROCESSING DEVICE, DEPTH-IMAGE PROCESSING SYSTEM, DEPTH-IMAGE PROCESSING METHOD, AND RECORDING MEDIUM

(71) Applicant: FUJITSU LIMITED, Kanagawa (JP)

(72) Inventors: Shoichi Masui, Sagamihara (JP); Hiroaki Fujimoto, Kawasaki (JP); Kazuhiro Yoshimura, Kawasaki (JP); Takuya Sato, Yokohama (JP); Kazuo Sasaki, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/676,404

(22) Filed: Nov. 6, 2019

(65) Prior Publication Data
US 2020/0074679 A1 Mar. 5, 2020

Related U.S. Application Data

(63) Continuation of application No. PCT/JP2017/018034, filed on May 12, 2017.

(51) Int. Cl.
*G06T 7/73* (2017.01)
*G06T 7/50* (2017.01)
(Continued)

(52) U.S. Cl.
CPC ............ *G06T 7/75* (2017.01); *G06K 9/00369* (2013.01); *G06T 7/194* (2017.01); *G06T 7/50* (2017.01);
(Continued)

(58) Field of Classification Search
CPC ......... G06T 19/00; G06T 17/20; G06T 17/00; G06T 15/10; G06T 15/00; G06T 15/405; G06T 15/40; G06T 15/005; G06T 15/503
See application file for complete search history.

(56) References Cited

U.S. PATENT DOCUMENTS

| 2007/0268295 A1 | 11/2007 | Okada |
| 2011/0210915 A1 | 9/2011 | Shotton et al. |

(Continued)

FOREIGN PATENT DOCUMENTS

| JP | 2004-226197 A | 8/2004 |
| JP | 2007-310707 A | 11/2007 |

(Continued)

OTHER PUBLICATIONS

ISR—International Search Report [Forms PCT/ISA/210, 220] and Written Opinion of the International Searching Authority [PCT/ISA/237] for PCT/JP2017/018034 dated Jul. 25, 2017.

(Continued)

*Primary Examiner* — Todd Buttram
(74) *Attorney, Agent, or Firm* — Fujitsu Patent Center

(57) ABSTRACT

A depth-image processing device includes: a memory; and a processor coupled to the memory and configured to: generate, cased on a synthetic model in which a three-dimensional model of a human body and a three-dimensional model of an object are combined, a plurality of learning images in which a depth image that indicates a distance from a reference position to respective positions on the human body or to respective positions on the object, and a part image to identify any one of respective parts of the human body and a cart of the object are associated with each other, and learn an identifier in which a feature of the depth image and any one of a part of the human body and a part of the object are associated with each other, based on the learning images.

7 Claims, 17 Drawing Sheets

(51) Int. Cl.
  *G06T 7/194* (2017.01)
  *G06K 9/00* (2006.01)
  *G06T 17/00* (2006.01)
(52) U.S. Cl.
  CPC .... *G06T 17/00* (2013.01); *G06T 2207/10028* (2013.01); *G06T 2207/20081* (2013.01); *G06T 2207/20212* (2013.01); *G06T 2207/30196* (2013.01)

(56) References Cited

U.S. PATENT DOCUMENTS

| | | | |
|---|---|---|---|
| 2011/0227923 A1* | 9/2011 | Mariani | G06K 9/00208 345/427 |
| 2011/0228976 A1 | 9/2011 | Fitzgibbon et al. | |
| 2011/0293180 A1 | 12/2011 | Criminisi et al. | |
| 2012/0239174 A1 | 9/2012 | Shotton et al. | |
| 2014/0037197 A1* | 2/2014 | Thorne | G06K 9/6255 382/159 |
| 2015/0036879 A1 | 2/2015 | Tsukamoto et al. | |
| 2016/0125243 A1 | 5/2016 | Arata et al. | |
| 2016/0284017 A1* | 9/2016 | Almog | G06Q 30/0643 |
| 2018/0300590 A1* | 10/2018 | Briggs | G06T 7/70 |
| 2020/0042782 A1 | 2/2020 | Masui et al. | |

FOREIGN PATENT DOCUMENTS

| | | |
|---|---|---|
| JP | 2012-120647 | 6/2012 |
| JP | 2015-167008 | 9/2015 |
| JP | 2016-091108 | 5/2016 |
| JP | 2016-212688 | 12/2016 |
| WO | 2015/186436 A1 | 12/2015 |
| WO | WO-2015186436 A1 * | 12/2015 ............. H04N 5/232 |

OTHER PUBLICATIONS

EESR—The Extended European Search Report issued for European Patent Application No. 17909349.7 dated Feb. 18, 2020.
ISR—International Search Report and Written Opinion of the International Searching Authority (Form PCT/ISA/210, 220, and 237), mailed for International Application PCT/JP2017/018107 dated Jul. 25, 2017 (11 pages).
EESR—Extended European Search Report issued for European Patent Application No. 17909348.9 dated Feb. 21, 2020.
Gregory Rogez et al., "Understanding Everyday Hands in Action from RGB-D Images", 2015 IEEE International Conference on Computer Vision (ICCV), pp. 3889-3987, XP032866748.
Sharm Vivek et al., "Low-cost scene modeling using a density function improves segmentation performance", 2016 25th IEEE International Symposium on Robot and Human Interactive Communication (RO-MAN), IEEE, pp. 77-84, XP033006128.
Jamie Shotton et al., "Real-time human pose recognition in parts from single depth images", Communications of the ACM, Association for Computing Machinery, Inc., Jan. 2013, vol. 56, No. 1, pp. 116-124, XP058010058.
Dong-Luong Dinh et al., "Hand number gesture recognition using recognized hand parts in depth images", Multimedia Tools and Applications, Kluwer academic publishers, vol. 75, No. 2, pp. 1333-1348, XP035924513.
JPOA—Office Action (Notice of Reasons for Refusal) of Japanese Patent Application No. 2019-516851 dated Jul. 14, 2020, with English translation.
JPOA—Office Action (Notice of Reasons for Refusal) of Japanese Patent Application No. 2019-516863 dated Jul. 28, 2020, with English translation.
** Reference WO 2015/186436 cited in both of the Office Actions was previously submitted in the IDS dated Nov. 6, 2019.
JPOA—Japanese Office Action dated Oct. 6, 2020 for Japanese Patent Application No. 2019-516851, with English translation.
EPOA—European Office Action dated Mar. 11, 2021 for European Patent Application No. 17909349.7.
USPTO—Non-Final Office Action dated Mar. 8, 2021 for related U.S. Appl. No. 16/601,643 [pending].
USPTO—Notice of Allowance dated Jun. 15, 2021 for related U.S. Appl. No. 16/601,643 [allowed].

* cited by examiner

FIG.5
| SYNTHETIC MODEL NUMBER | SYNTHETIC MODEL DATA |
|---|---|
| SYNTHETIC MODEL 1 | 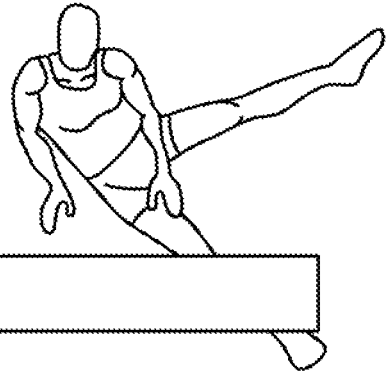 |
| SYNTHETIC MODEL 2 | 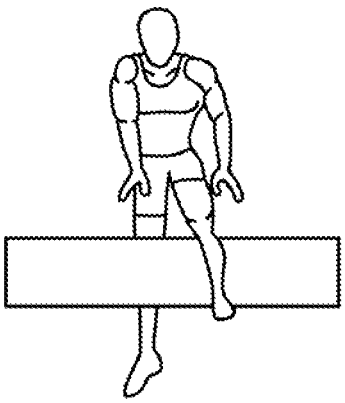 |
| SYNTHETIC MODEL 3 | 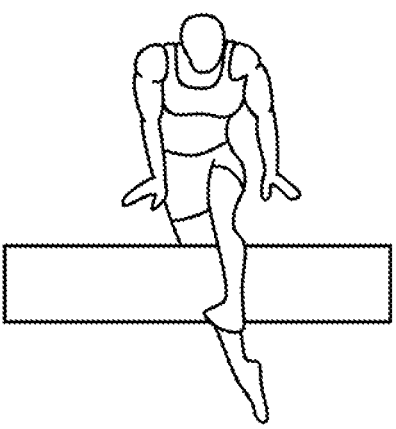 |
| ... | ... |

FIG.6

| LEARNING IMAGE NUMBER | PART-LABEL IMAGE DATA | DEPTH IMAGE DATA |
|---|---|---|
| LEARNING IMAGE 1 | PART-LABEL IMAGE DATA OF LEARNING IMAGE 1 | DEPTH IMAGE DATA OF LEARNING IMAGE 1 |
| LEARNING IMAGE 2 | PART-LABEL IMAGE DATA OF LEARNING IMAGE 2 | DEPTH IMAGE DATA OF LEARNING IMAGE 2 |
| LEARNING IMAGE 3 | PART-LABEL IMAGE DATA OF LEARNING IMAGE 3 | DEPTH IMAGE DATA OF LEARNING IMAGE 3 |
| LEARNING IMAGE 4 | PART-LABEL IMAGE DATA OF LEARNING IMAGE 4 | DEPTH IMAGE DATA OF LEARNING IMAGE 4 |
| ... | ... | ... |

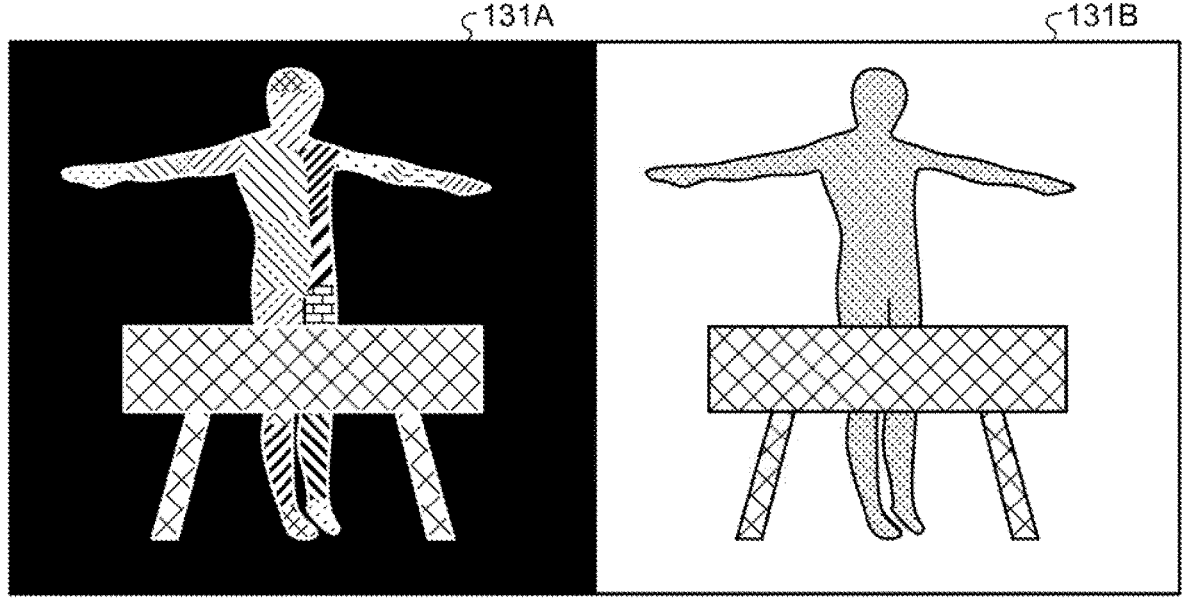

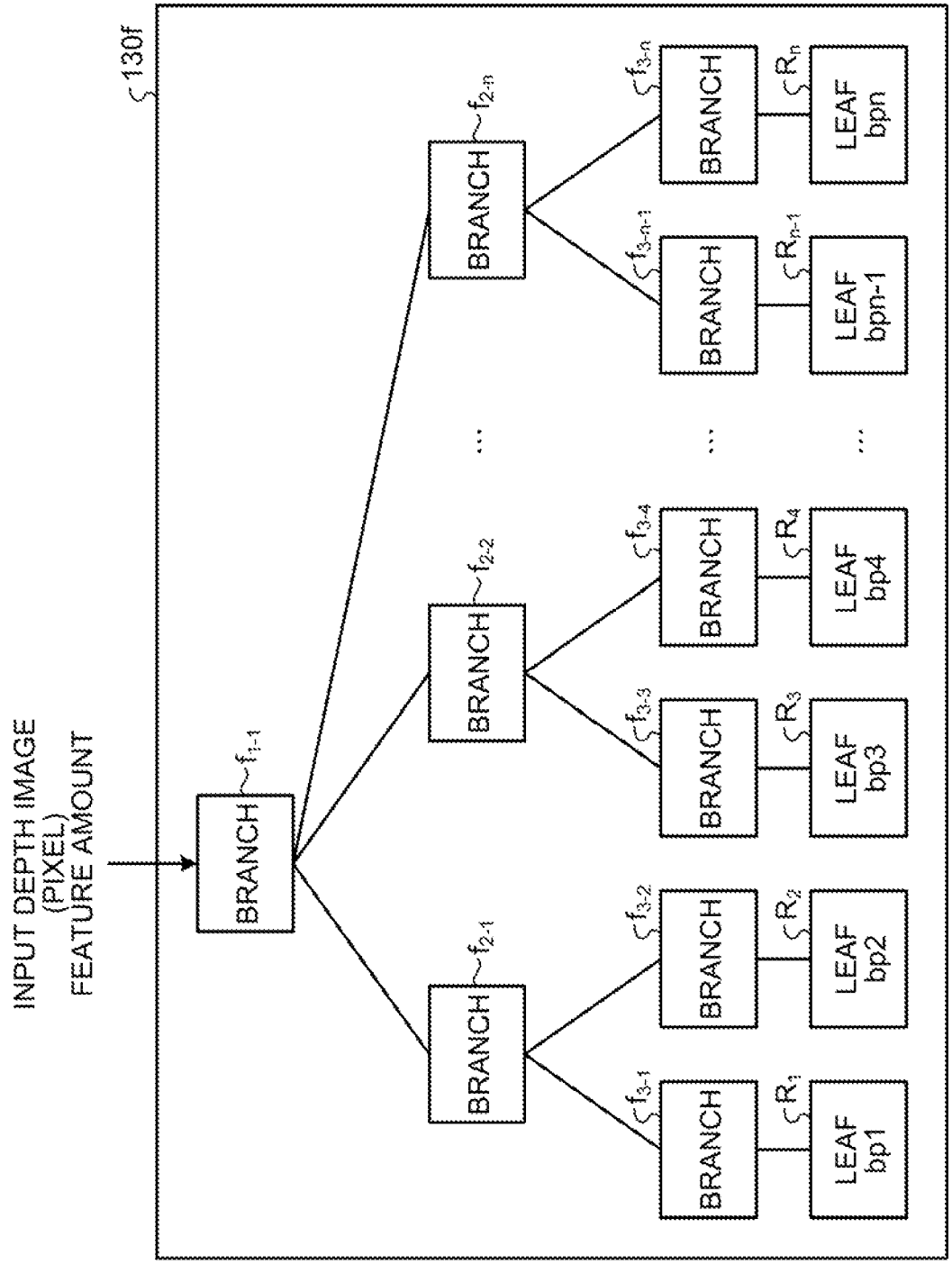

DEPTH-IMAGE PROCESSING DEVICE, DEPTH-IMAGE PROCESSING SYSTEM, DEPTH-IMAGE PROCESSING METHOD, AND RECORDING MEDIUM

CROSS-REFERENCE TO RELATED APPLICATION

This application is a continuation application of International Application PCT/JP2017/018034, filed on May 12, 2017 and designating the U.S., the entire contents of which are incorporated herein by reference.

FIELD

The present invention relates to a depth-image processing device, and the like.

BACKGROUND

FIG. 14 is a diagram for describing a related system to perform posture recognition. As illustrated in FIG. 14, the related system acquires a depth image 7 of a subject 5a by using a depth sensor 6. The related system estimates joint positions based on the depth image 7, to identify a frame position 5b of the subject 5a, and thereby estimates a posture of the subject 5a.

FIG. 15 is a diagram for describing an application example of the related system. In the example illustrated in FIG. 15, a depth image of the subject 5a is acquired by using the depth sensor 6, a posture of the subject 5a is recognized, and an avatar 5c is caused take the same posture as the subject 5c in a game.

FIG. 16 is a diagram for describing an example of a related technique of posture recognition. The related technique acquires at least one depth image including a human body (step S10). For example, a distance map 1 includes a foreground pixel 1a related to a human body to be identified, and a background pixel 1b of other than that.

The related technique separates the background pixel 1c from the depth image 1 to acquire a depth image 1c that only includes the foreground pixel (step S11). In the related technique, the depth image 1c is input into an "identifier" that identifies a part of a person, to divide a region of the human body in the depth image 1c into part labels bp1 to bp14 (step S12).

The related technique proposes multiple human frame models having multiple three-dimensional frame positions based on the respective part labels bp1 to bp14 of the human body (step S13). In the related technique, a frame model having the highest likeliness is selected from among the frame models, and a posture of the person is recognized (step S14).

The identifier used in the related technique in FIG. 16 and the like learns by performing the processing as described in FIG. 17. FIG. 17 is a flowchart of a procedure of learning processing of the related identifier. As illustrated in FIG. 17, in the related technique, a motion capture data is acquired (step S20). In the related technique, human-body retargeting is performed based on the motion capture data, and human body models in various postures are thereby generated (step S21).

In the related technique, similar human-body model postures are removed from among the respective human models, and leaves only a unique human-model body posture, to remove the redundancy (step S22). In the related technique, a part label image and a depth image relative to an assumed position of the depth sensor are respectively generated based on a unique human body model (step S23). In the related technique, by repeatedly learning correspondence between a feature of the respective positions in the depth image (and a feature of a peripheral position) and a part label based on sets of a part label image and a depth image, the identifier is generated (step S24).

Patent Document 1: Japanese Laid-open Patent Publication No. 2016-212688
Patent Document 2: Japanese Laid-open Patent Publication No. 2015-167008
Patent Document 3: Japanese Laid-open Patent Publication No. 2012-120647
Patent Document 4: Japanese Laid-open Patent Publication No. 2016-091108
Patent Document 5: U.S. Patent No. 2015/0036879
Patent Document 6: U.S. Patent No. 2016/0125243

SUMMARY

According to an aspect of the embodiments, a depth-image processing device includes: a memory; and a processor coupled to the memory and configured to: generate, based on a synthetic model in which a three-dimensional model of a human body and a three-dimensional model of an object are combined, a plurality of learning images in which a depth image that indicates a distance from a reference position to respective positions on the human body or to respective positions on the object, and a part image to identify any one of respective parts of the human body and a part of the object are associated with each other, and learn an identifier in which a feature of the depth image and any one of a part of the human body and a part of the object are associated with each other, based on the learning images.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of a data structure of a synthetic model table;
FIG. 6 is a diagram illustrating an example of a data structure of a learning image table;
FIG. 7 is a diagram for describing a relationship between a part label image and a depth image;
FIG. 8 is a diagram illustrating an example of a data structure of identifier data.

DESCRIPTION OF EMBODIMENTS

However, in the related technique described above, there is a problem that a part of a human body cannot be determined appropriately.

Figure 14:
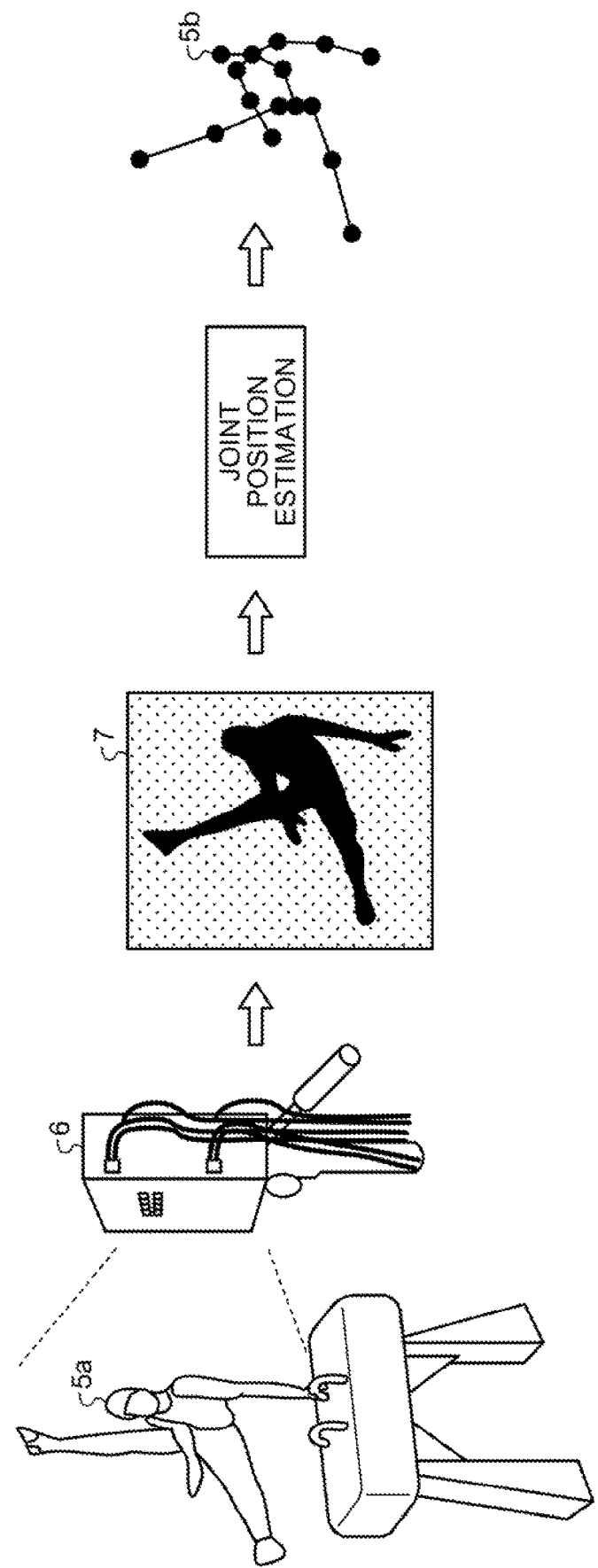
FIG. 14 is a diagram for describing a related system that performs posture recognition.
Figure 15:
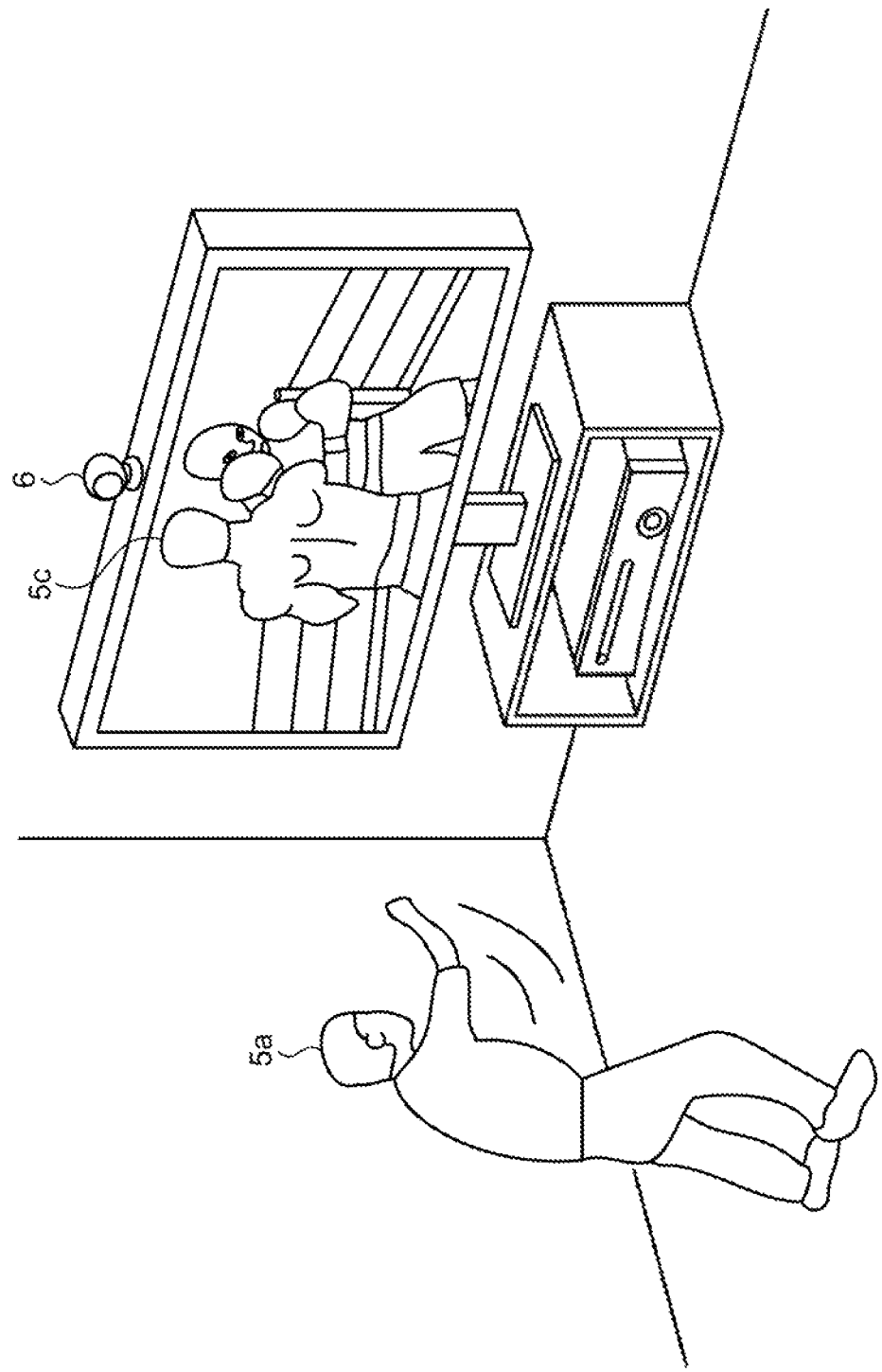
FIG. 15 is a diagram for describing an application example of the related system.

For example, when the posture recognition of a human body is performed with the related system described in FIG. 14, occlusion by an object occurs. The occlusion by an object is a state in which a part of a human body to be recognized is not seen, blocked by another object.

Figure 16:
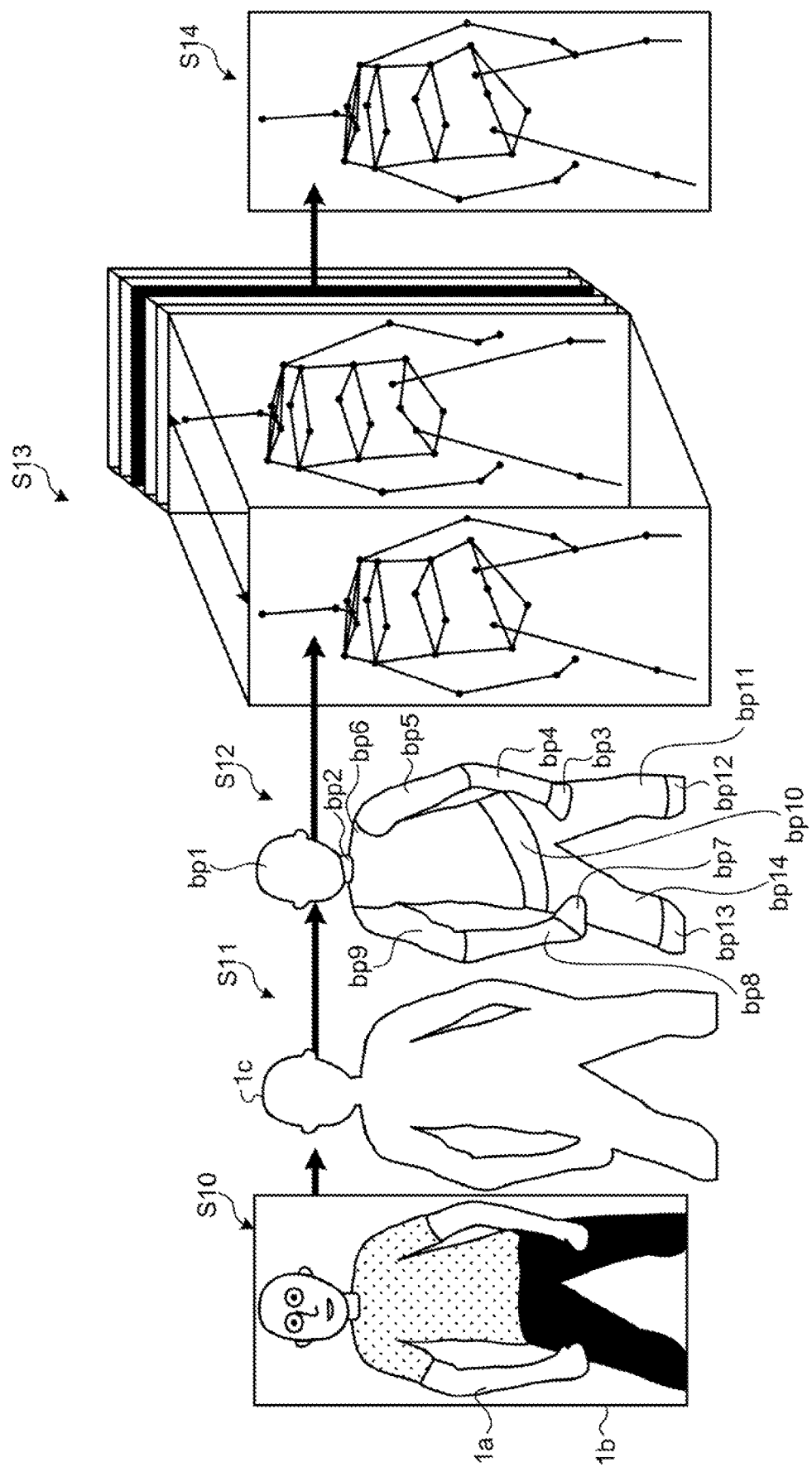
FIG. 16 is a diagram for describing an example of the related technique of posture recognition.
Figure 17:
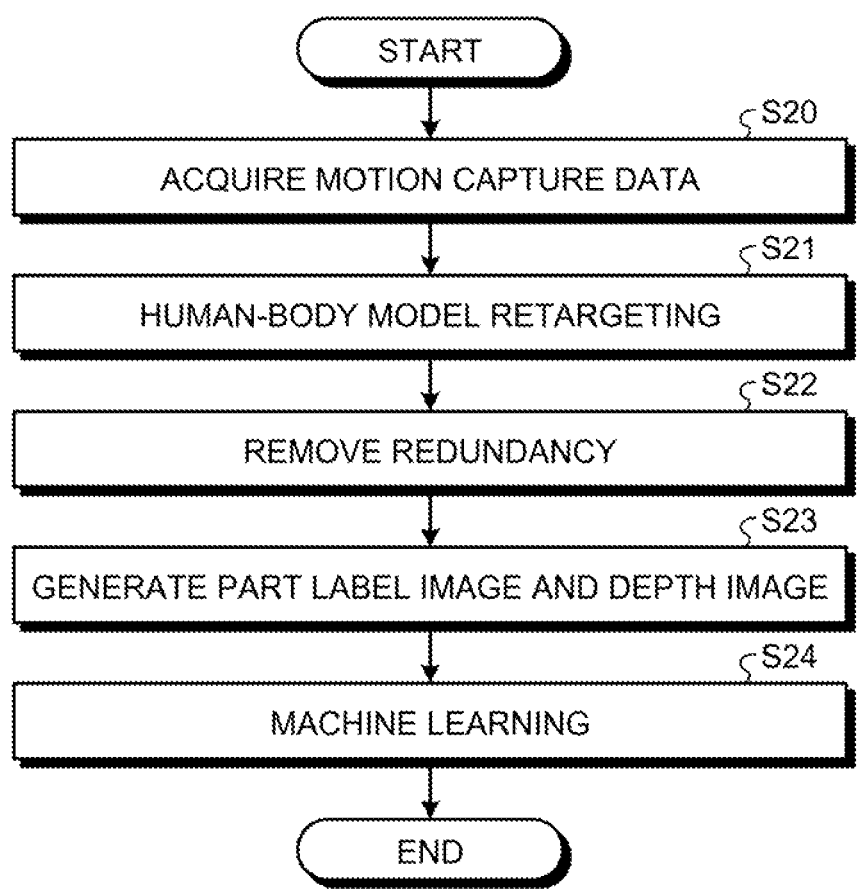
FIG. 17 is a flowchart illustrating a procedure of learning processing of a related identifier.
Figure 18:
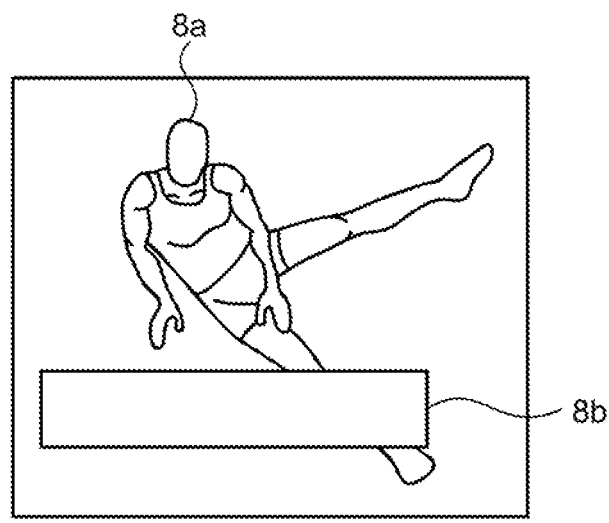
FIG. 18 is a diagram illustrating an example of occlusion by an object.

FIG. 18 is a diagram illustrating an example of the occlusion by an object. In the example illustrated in FIG. 18, a part of the body of a subject 8a is positioned in a hidden state behind a pommel horse 8b in a pommel horse exercise. When the related technique described in FIG. 16 is applied to perform the posture recognition of the subject 8a in the state as illustrated in FIG. 18, a normal part label is not assigned, and accurate posture recognition cannot be performed.

Figure 19:
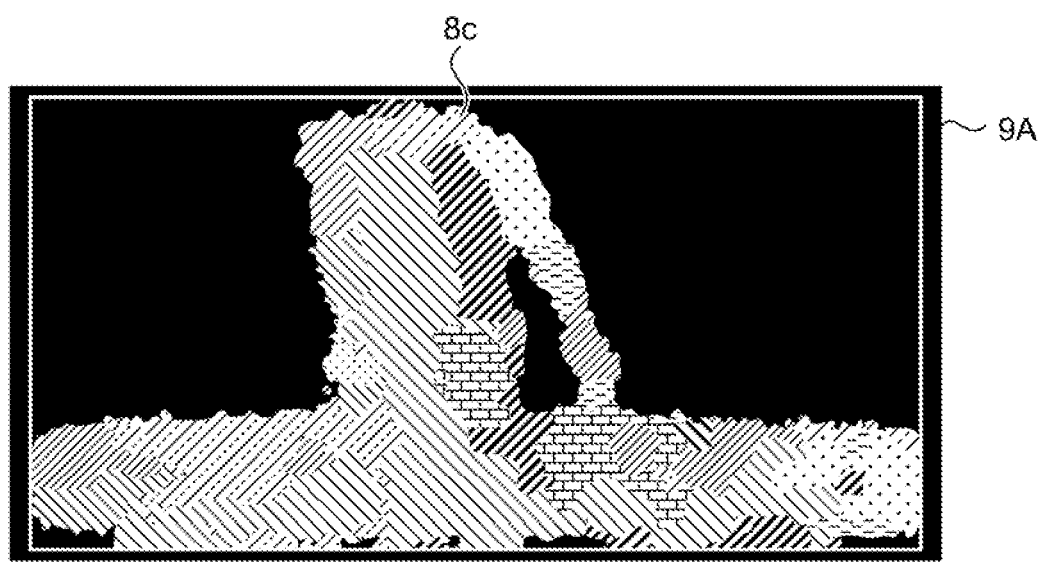
FIG. 19 is a diagram (1) for describing a problem in the related technique.
Figure 20:
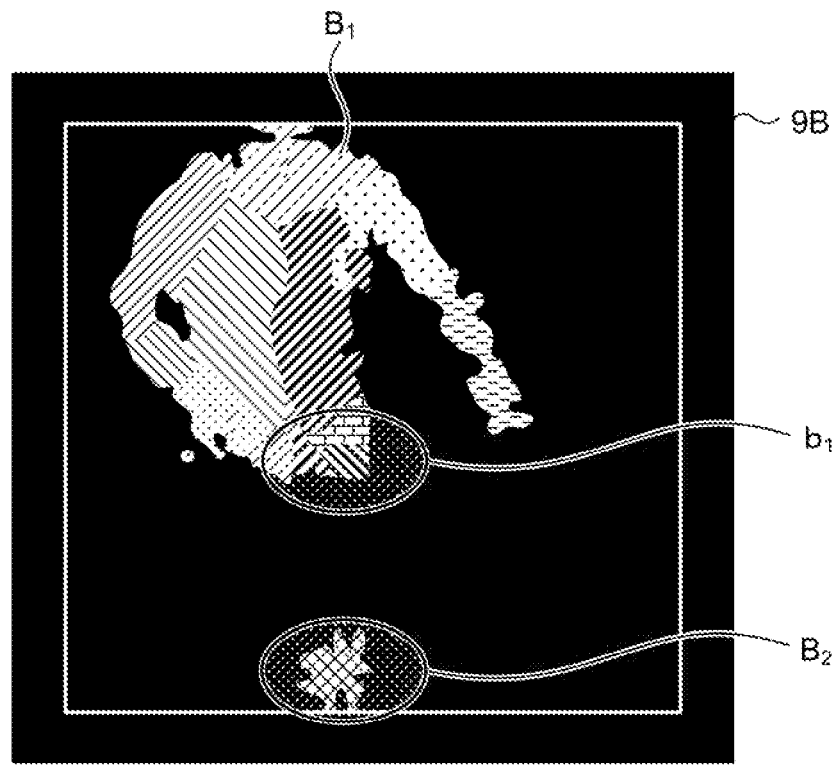
FIG. 20 is a diagram (2) for describing a problem in the related technique.

FIG. 19 and FIG. 20 are diagrams for describing a problem in the related technique. For example, in the related technique, a depth image including the subject 8a and the pommel horse 8b is acquired, a background is removed from the depth image, and a part label is assigned, to obtain a part-label identification result 9A illustrated in FIG. 19. In the related technique, a region 8c including the subject 8a and the pommel horse 8b is regarded as a region of the subject 8a, and a part label is assigned to the pommel horse 8b as a part of the human body.

On the other hand, only a depth image of the fixed pommel horse 8b can be acquired in advance in a state in which the subject 8a is not present, and the depth image of only the pommel horse 8b can be removed from a depth image captured when the subject 8a is actually moving on the pommel horse 8b. When the depth image of only the pommel horse 8b is thus removed, a depth image of a leg portion hidden behind the pommel horse 8b cannot be detected and, therefore, it is only possible to obtain a depth image separated by the pommel horse 8b.

For example, if a part label is assigned in the depth image in which the depth image obtained by removing the depth image of the pommel horse 8b, a part-label identification result 98 illustrated in FIG. 20 is obtained. When a region of a human body is separated, respective separated regions $B_1$, $B_2$ are recognized as respective single regions of the subject, and part labels are thus assigned. For example, to the region $B_1$, a leg part label can be assigned, and to the region $B_2$, a part label of a part other than a leg of a human body (for example, hand) can be assigned.

As described above, if a part label is not determined appropriately, the accuracy of the posture recognition cased on a part-label determination result is reduced.

In one aspect, the embodiments provide a depth-image processing device, a depth-image processing system, a depth-image processing method, and a depth-image processing program that are capable of determining a part of a human body appropriately.

Hereinafter, an embodiment of a depth-image processing device, a depth-image processing system, a depth-image processing method, and a depth-image processing program according to the present invention will be described in detail based on the drawings. Note that this embodiment is not intended to limit the invention.

Embodiment

Figure 1:
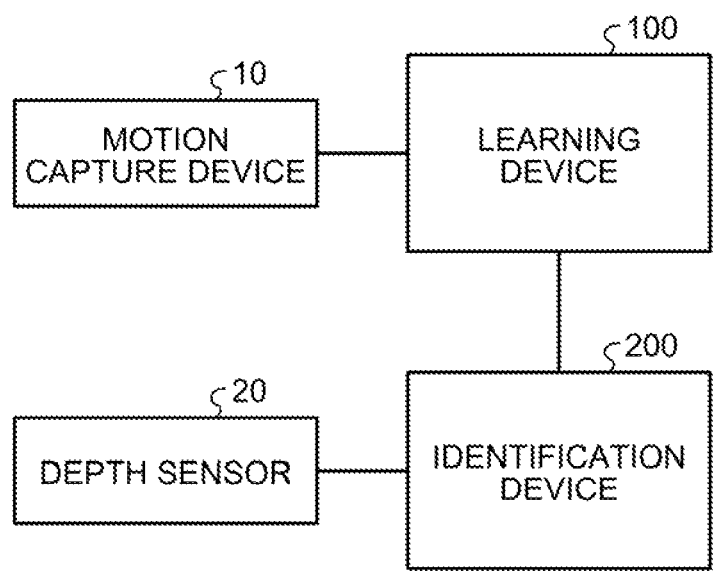
FIG. 1 is a diagram illustrating an example of a depth-image processing system according to an embodiment.

FIG. 1 is a diagram illustrating an example of a depth-image processing system according to the present embodiment. As illustrated in FIG. 1, this depth-image processing system includes a learning device 100 and an identification device 200. The learning device 100 is connected to a motion capture device 10. The identification device 200 is connected to a depth sensor 20. Moreover, the learning device 100 and the identification device 200 are connected to each other.

The learning device 100 is a device that learns identifier data used when the identification device 200 identifies a posture of a subject. The identification device 200 is a device that identifies a posture of a subject by using the identifier data learned by the learning device 100. The learning device 100 and the identification device 200 are an example of the depth-image processing device.

Figure 2:
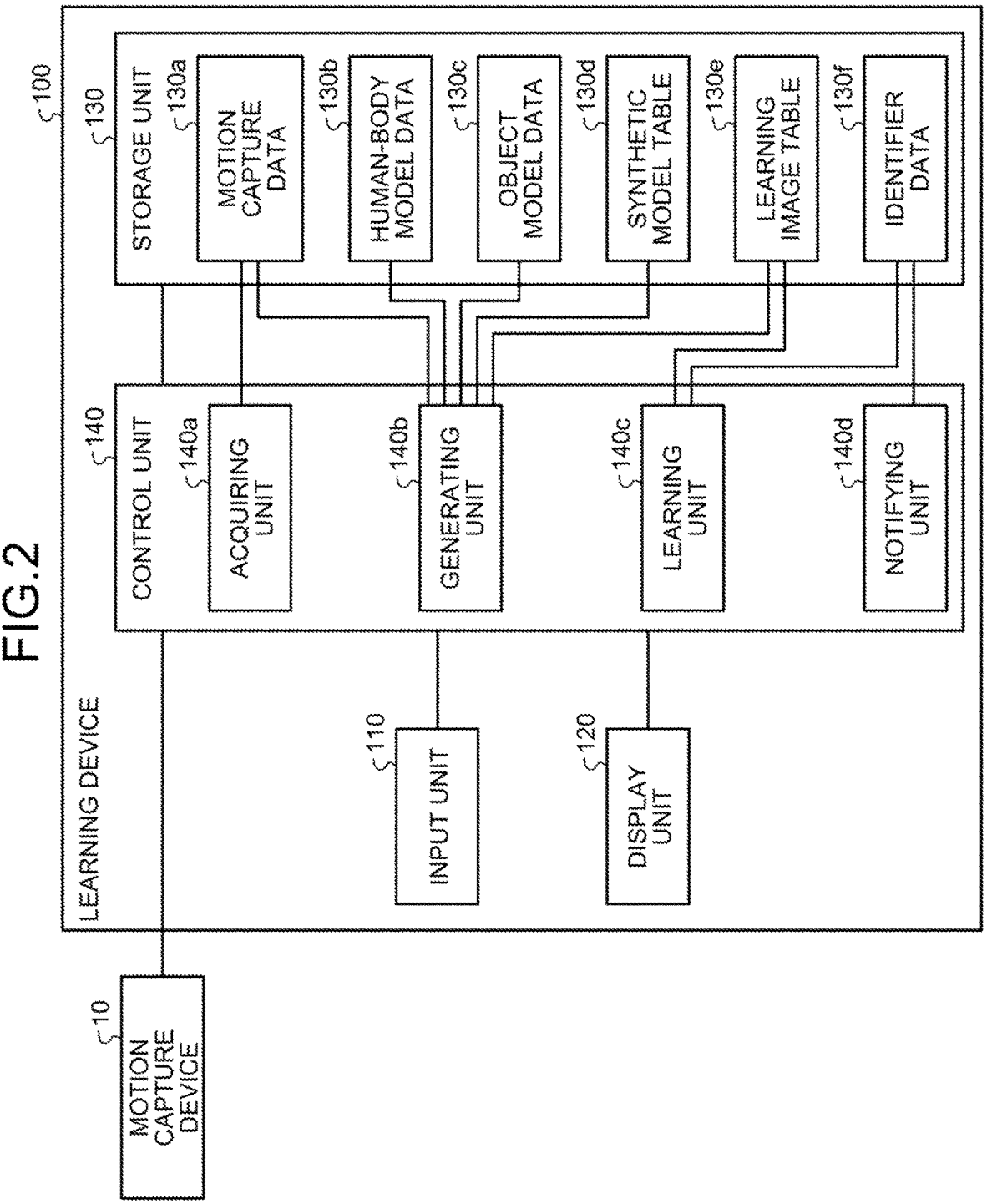
FIG. 2 is a diagram illustrating an example of a configuration of a learning device.

FIG. 2 is a diagram illustrating an example of a configuration of the learning device. As illustrated in FIG. 2, this learning device 100 is connected to the motion capture device 10. The learning device 100 includes an input unit 110, a display unit 120, a storage unit 130, and a control unit 140.

Figure 3:
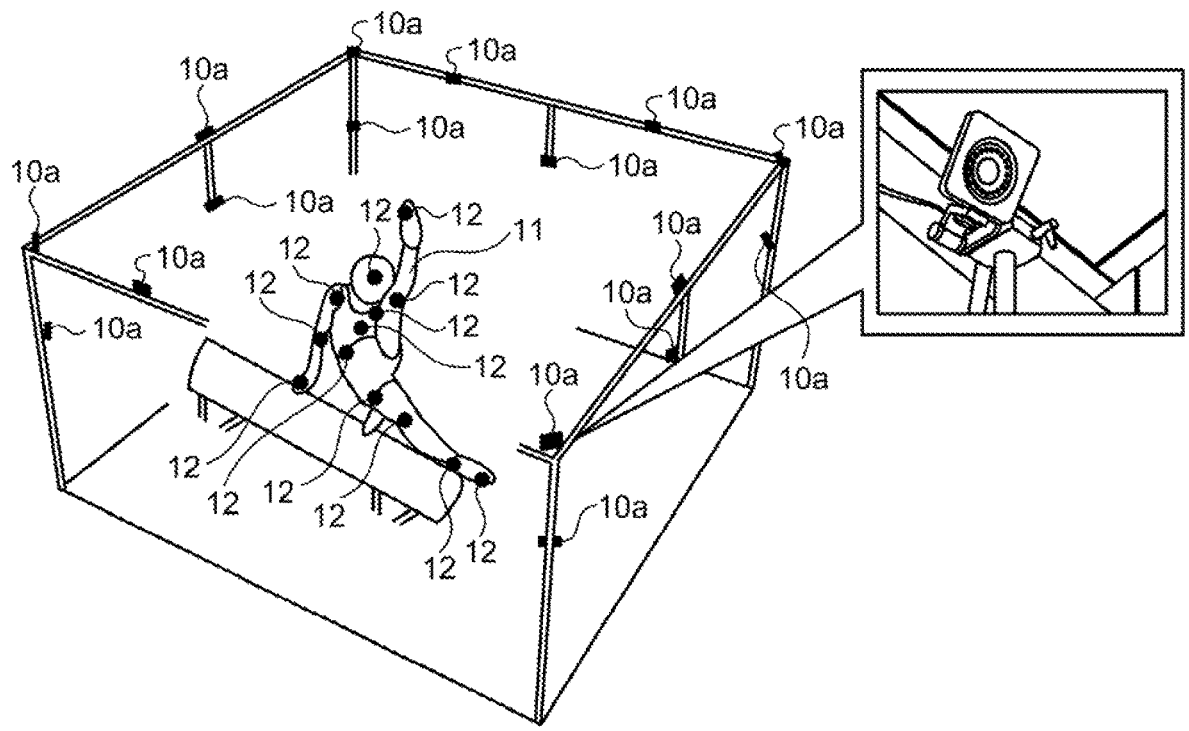
FIG. 3 is a diagram for describing a capture camera.

The motion capture device 10 is connected to plural capture cameras 10a. FIG. 3 is a diagram for describing the motion camera. As illustrated in FIG. 3, the capture cameras 10a are arranged around a subject 11. At respective joint positions of the subject 11, markers 12 are respectively attached.

For example, the motion capture device 10 records movement of the markers 12 of the subject 11 by using the respective cameras 10a, and acquires a three-dimensional joint position from the respective markers 12. The motion capture device 10 sequentially records the three-dimensional joint positions acquired from position coordinates of the respective markers 12, and thereby generates motion capture data. The motion capture device 10 outputs the motion capture data to the learning device 100.

Returning hack to description of FIG. 2, the input unit 110 is an input device to input various kinds of information to the learning device 100. For example, the input unit 110 corresponds to a keyboard, a mouse, a touch panel, and the like.

The display unit 120 is a display device that displays information output from the control unit 140. For example, the display unit 120 corresponds to a liquid crystal display, a touch panel, and the like.

The storage unit 130 includes motion capture data 130a, human-body model data 130b, object model data 130c, a synthetic model table 130d, a learning image table 130e, and identifier data 130f. The storage unit 130 corresponds to a semiconductor memory device, such as a random-access memory (RAM), a read-only memory (ROM), and a flash memory, and a storage device, such as a hard disk drive (HDD).

The motion capture data 130a is data that records movement of a three-dimensional joint position of a person, generated by the motion capture device 10. For example, the motion capture data 130a has information about a joint position per frame.

The human-body model data 130b is data of a three-dimensional model of a human body. The human-body model data 130b is information that is generated by combining a three-dimensional human body model with a skeleton frame based on the respective joint positions of a person of the motion capture data 130a.

Figure 4:
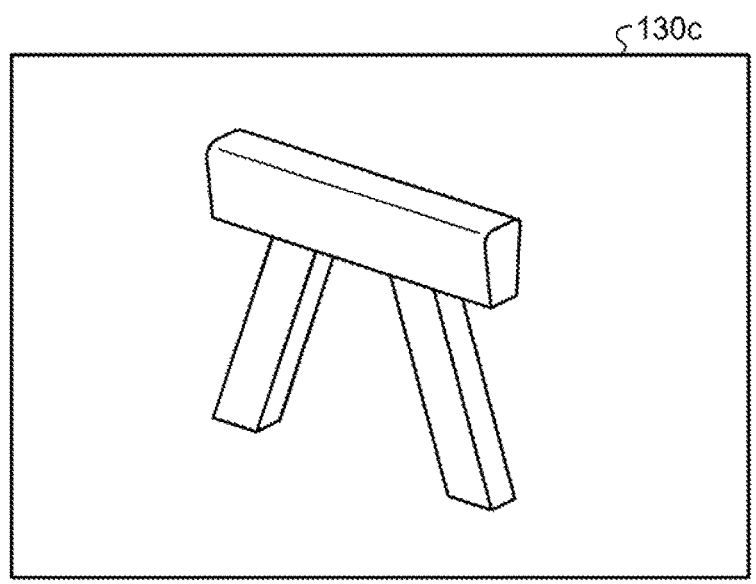
FIG. 4 is a diagram illustrating an example of object model data.

The object model data 130c is a three-dimensional model of an object that is not a person. FIG. 4 is a diagram illustrating an example of the object model data. The object herein is a pommel horse as an example, but a ring of flying rings, a horizontal bar, a parallel bars, a vault, and the like also correspond thereto in gymnastics, and it is not limited thereto.

The synthetic model table 130d is a table that has plural pieces of synthetic model data that is obtained by synthesizing the human-body model data 130b and the object model data 130c. FIG. 5 is a diagram illustrating an example of a data structure of the synthetic model table. As illustrated in FIG. 5, this synthetic model table 130d associates a synthetic model number and synthetic model data. The synthetic model number is a number to identify synthetic model data. The synthetic model data is data that is obtained as a result of synthesizing the human-body model data 130b in one moment (frame) in a series of movement and the object model data 130c.

The learning image table 130e is a table that has plural pieces of learning image data to generate the identifier data 130f. FIG. 6 is a diagram illustrating an example of a data structure of the learning image table. As illustrated in FIG. 6, this learning image table 130e associates a learning image number, part-label image data, and depth image data with one another. The learning image number is a number to identify a set of part-label image data to be a learning image and depth image data uniquely. The part-label image data is information that indicates respective parts in the synthetic model data (human body+object) and an object with unique part labels. The depth image data is a depth image that is generated from the synthetic model data (human body+object). The associated part-label image data and depth image data are generated from the same synthetic model data.

FIG. 7 is a diagram for describing a relationship between the part label image and the depth image. FIG. 7 illustrates a set of part-label image data 131A and depth image data 131B associated with one learning image number. The depth image data 131B is depth image data that indicates a distance, for example, from a reference position, such as a position of a camera, to each position in the synthetic model data per pixel. The part-label image data 131A is information indicating respective parts of a person and an object included in the depth image data 131B with unique part labels. For example, a region of a person is separated into plural parts based on a predetermined separation policy, and a unique part label is assigned to a region corresponding to each part. Moreover, as for an object, a part label different from the parts of a person is assigned to a region corresponding to the object.

The identifier data 130f constitutes an identifier that associates each pixel of the depth image with a part label based on a feature amount of a periphery of one position in the depth image data. To identify a part label of one position in the depth image data, by inputting a feature amount of a periphery of one position in the depth image data to the identifier, the part label of one position is output.

FIG. 8 is a diagram illustrating an example of a data structure of the identifier data. As illustrated in FIG. 8, this identifier data 130f includes plural branch nodes $f_{1-1}$, $f_{2-1}$, to $f_{2-n}$, $f_{3-1}$ to $f_{3-n}$, and leaf nodes $R_1$ to $R_n$. In the following description, the branch nodes $f_{1-1}$, $f_{2-1}$ to $f_{2-n}$, $f_{3-1}$ to $f_{3-n}$ are correctively referred to as a branch node f. The leaf nodes $R_1$ to $R_n$ are collectively referred to as a leaf node R.

The branch node f is a node that specifies a branch destination among the subordinate branch nodes f, based on the feature amount of the periphery of one position in the depth image data. When the branch node f is the branch nodes $f_{3-1}$ to $f_{3-n}$, either one out of the subordinate leaf nodes R is specified as a branch destination based on a feature amount of one position in the depth image data and a feature amount of a periphery of one position.

The leaf node R is a node that stores data indicating a part of a human body or a part of an object.

Returning back to description of FIG. 2, the control unit 140 includes an acquiring unit 140a, a generating unit 140b, a learning unit 140c, and a notifying unit 140d. The control unit 140 can be implemented by a central processing unit (CPU), a micro processing unit (MPU), or the like. Moreover, the control unit 140 can also be implemented by a hardwired logic, such as an application specific integrated circuit (ASIC) and a field programmable gate array (FPGA).

The acquiring unit 140a is a processing unit that acquires the motion capture data 130a from the motion capture device 10. The acquiring unit 140a stores the acquired motion capture data 130a in the storage unit 130.

The generating unit 140b is a processing unit that generates the learning image table 130e. For example, the generating unit 140b performs processing of generating the human-body model data 130b, processing of generating the synthetic model table 130d, and processing of generating the learning image table 130e. Note that the generating unit 140b may newly generate the object model data 130c, or may use existing object model data as the object model data 130c.

The processing of generating the human-body model data 130b by the generating unit 140b will be described. The generating unit 140b acquires information about joint positions of a person from a series of movement of the joint positions of a person included in the motion capture data 130a, and connects the respective joint, positions to a skeleton, thereby generating skeleton frame information of the person. The generating unit 140b generates human-body model corresponding to the skeleton frame information by combining parts of a human body model prepared in advance with the skeleton frame information. That is, the processing performed by the generating unit 140b corresponds to processing of combining the motion capture data 130a with the human body model.

The processing of generating the synthetic model table 130d by the generating unit 140b will be described. The generating unit 140b acquires a human body model from the human-body model data 130b for a series of the motion capture data 130a, and combines the acquired human body modal with an object model of the object model data 130c, thereby generating the synthetic model data. The generating unit 140b generates plural pieces of the synthetic model data by repeating the processing of combining a human body model corresponding to another frame with the object model. The generating unit 140b associates the synthetic model data with a synthetic model number, and registers it in the synthetic model table 130d.

When similar synthetic model data is included in plural pieces of the synthetic model data registered in the synthetic model table 130d, the generating unit 140b may perform processing of eliminating redundancy. For example, the generating unit 140b determines that synthetic model data, a total value of differences of the respective joint positions of the synthetic model data of which is smaller than a threshold as similar synthetic model data. The generating unit 140b performs processing of deleting the synthetic model data, leaving one piece of synthetic model data out of the similar synthetic model data.

The processing of generating the learning image table 130e by the generating unit 140b will be described. The generating unit 140b refers to the synthetic model table 130d, and acquires synthetic model data of one synthetic model number. The generating unit 140b generates part-label image data and depth image data based on the acquired synthetic model data. The generating unit 140b associates the part-label image data and the depth image data with a learning image number, and registers it in the learning image table 130e.

For example, the generating unit 140b arranges part labels to identify a part of a human body in the synthetic model data in advance. The generating unit 140b sets a virtual reference position in three dimensions, and generates depth image data when the synthetic model data is viewed from this reference position. Moreover, the generating unit 140b classifies regions in the synthetic model data when the synthetic model data is viewed from the reference position into plural part labels, thereby generating the part-label image data. For example, part-label image data and depth image data that are generated from one identical piece of synthetic model data correspond to the part-label image data 131A and the depth image data 131B described in FIG. 7.

The generating unit 140b repeats the above processing for other pieces of synthetic model data stored in the synthetic model table 130d also, and thereby generates the part-label image data and the depth image data, to store in the learning image table 130e.

The learning unit 140c is a processing unit that performs repeated machine learning baaed on plural sets of the part-label image data and the depth image data included in the learning image table 130e, to generate the identifier data 130f. The learning unit 140c identifies a feature amount of a periphery of one position (x1, y1) in the depth image data, and a part label corresponding to one position (x1, y1). For example, the feature amount of the periphery of one position (x1, y1) may be unevenness of the depth image data of the periphery with reference to one position (x1, y1) in the depth image data, or may be other feature amounts. The part label corresponding to one position (x1, y1) corresponds to a part label assigned to one position (x1, y1) in the part-label image data.

Similarly, the learning unit 140c identifies a pattern of a feature amount of a periphery of one position (xn, yn) in the depth image data and a part label corresponding to one position (xn, yn) for each different position. The learning unit 140c generates the identifier data 130f by performing the repeated machine learning of patterns of respective different positions.

The notifying unit 140d is a processing unit that transmits the identifier data 130f generated by the learning unit 140c to the identification device 200.

Figure 9:
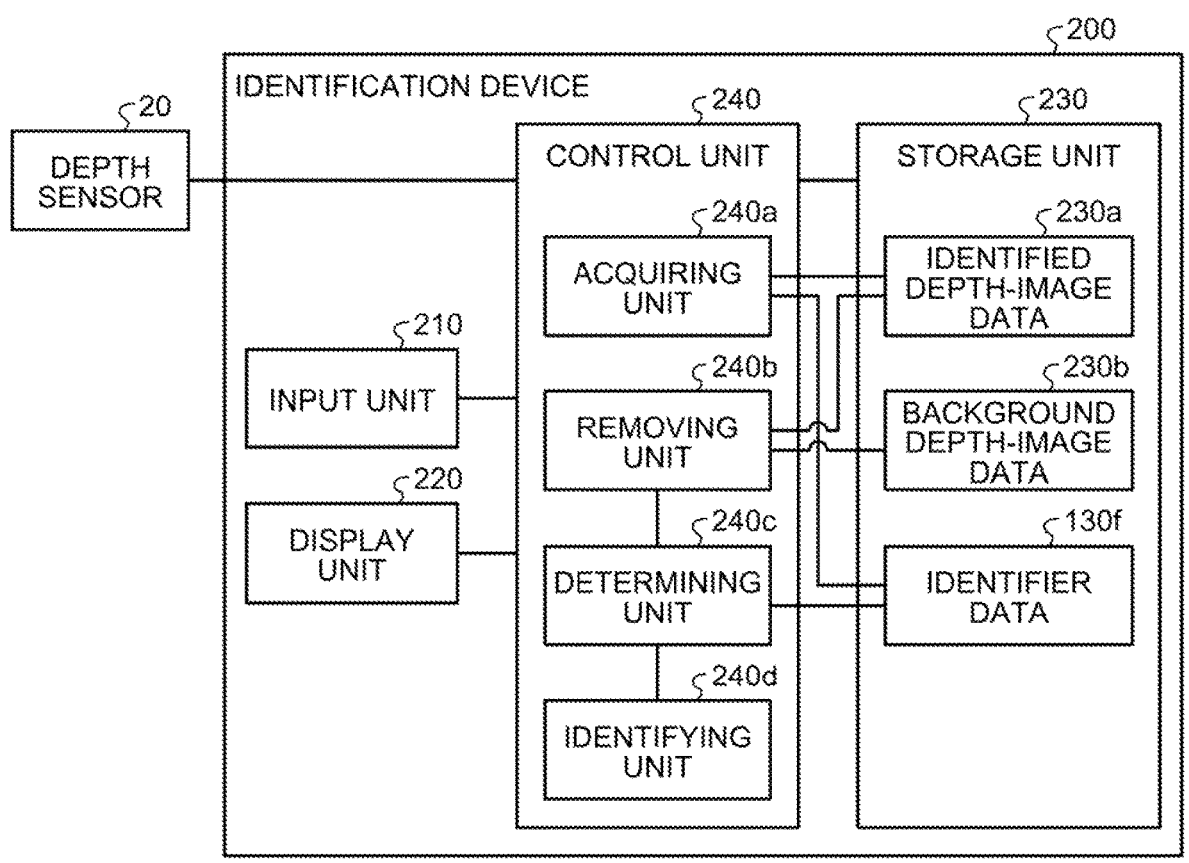
FIG. 9 is a diagram illustrating an example of a configuration of an identification device.

Subsequently, the identification device 200 will be described. FIG. 9 is a diagram illustrating an example of a configuration of the identification device. As illustrated in FIG. 9, this identification device 200 is connected to the depth sensor 20. The identification device 200 includes an input unit 210, a display unit 220, a storage unit 230, and a control unit 240.

The depth sensor 20 measures a depth image of a subject and a predetermined object (a pommel horse, or the like, not illustrated) when posture recognition processing is performed, and outputs data obtained by measuring the depth image to the identification device 200. In the following description, data of a depth image acquired from the depth sensor 20 is referred to as identified depth-image data 230a. The present embodiment, will, be described, supposing that the predetermined object is a pommel horse.

The input unit 210 is an input device to input various kinds of information to the identification device 200. For example, the input unit 210 corresponds to a keyboard, a mouse, a touch panel, and the like.

The display unit 220 is a display device that displays information output from the control unit 240. For example, the display unit 220 corresponds to a liquid crystal display, a touch panel, and the like.

The storage unit 230 includes identified depth-image data 230a, background depth-image data 230b, and identifier data 130f. The storage unit 230 corresponds to a semiconductor memory device, such as a RAM, a ROM, and a flash memory, and a storage device, such as an HDD.

The identified depth-image data 230a is depth image data measured by the depth sensor 20 at the recognition. The identified depth-image data 230a is data that indicates a distance from the depth sensor 20 to the subject and the object per position (pixel).

The background depth-image data 230b is depth image data of only a background imaged by the depth sensor 20 in a state in which the subject and the predetermined object is not present. The acquiring unit 240a acquires the background depth-image data 230b from the depth sensor 20 in advance, and stores it in the storage unit 230.

The identifier data 130f is identifier data that is generated by the learning device 100. A data structure of the identifier data 130f corresponds to the data structure described in FIG. 8.

The control unit 240 includes an acquiring unit 240a, a removing unit 240b, a determining unit 240c, and an identifying unit 240d. The control unit 240 can be implemented by a CPU, an MPU, or the like. Moreover, the control unit 24D can be implemented by a hardwired logic, such as an ASIC and an FPGA.

The acquiring unit 240a acquires the identified depth-image data 230a from the depth sensor 20, and stores it in the storage unit 230. The acquiring unit 240a acquires the identifier data 130f from the learning device 100, and stores the acquired identifier data 130f in the storage unit 230.

The removing unit 240b is a processing unit that removes information of a background from the identified depth-image data 230a by acquiring a difference between the identified depth-image data 230a and the background depth-image data 230b. The removing unit 240b outputs depth image data obtained by removing the information of a background from the identified depth-image data 230a to the determining unit 240c. In the following description, depth image data obtained by removing information of a background from the identified depth-image data 230a is referred to as "depth image data" simply.

The determining unit 240c is a processing unit that determines a corresponding part label for each position (pixel) in the depth image data based on the depth image data acquired from the removing unit 240b and the identifier data 130f. For example, the determining unit 240c compares a feature amount of a periphery of the depth image data and the respective branch nodes f of the identifier data 130f, follows the respective nodes f, and determines a part label indicated at the leaf node R of the destination as a part label of a determination result. The determining unit 240c repeats the above processing for the other pixels also, end thereby determines part labels corresponding to all pieces of the depth image data. The part labels corresponding to the respective positions include a part label that uniquely identify a part of a body, and a part label indicating that it is an object (pommel horse).

The determining unit 240c outputs a determination result in which the respective parts in the depth image data and the part labels are associated with each other to the identifying unit 240d.

The identifying unit 240d is a processing unit that identifies a posture of the subject based on a determination result of the determining unit 240c. For example, the identifying unit 240d removes the part label of the object, and suggests plural frame models of a human body having multiple three-dimensional positions based on the part label of a human body. The identifying unit 240d selects a frame model having the highest likeliness from among the frame models, and identifies a posture of the person based on the selected frame model.

Figure 10:
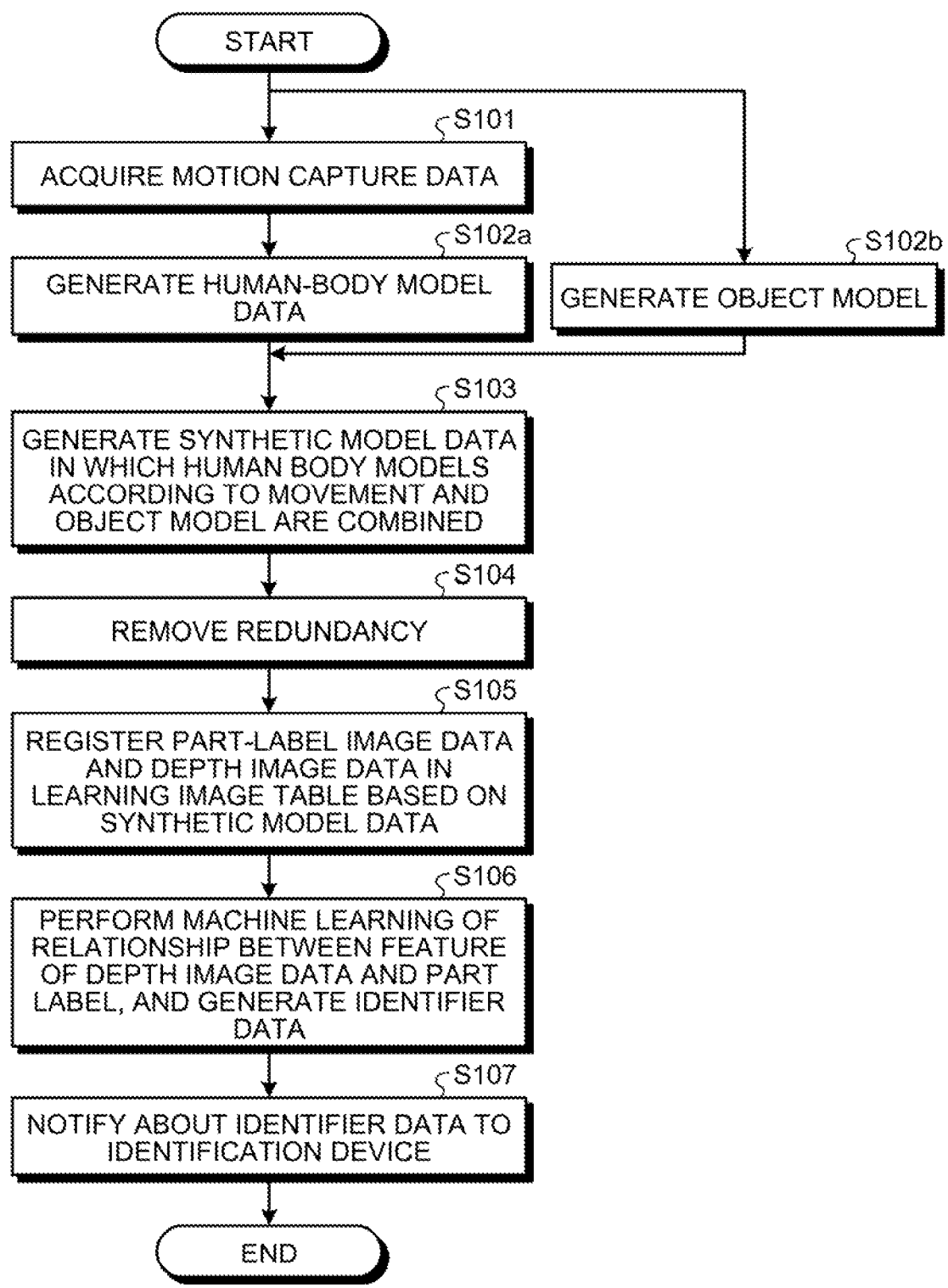
FIG. 10 is a flowchart illustrating a procedure of processing performed by a learning device according to the present embodiment.

Next, a procedure of processing performed by the learning device and a procedure of processing performed by the identification device 200 according to the present embodiment will be described with an example. FIG. 10 is a flowchart illustrating a procedure of the processing performed by the learning device according to the present embodiment. As illustrated in FIG. 10, the acquiring unit 140a of the learning device 100 acquires the motion capture data 130a from the motion capture device 10 (step S101).

The generating unit 140b of the learning device 100 generates the human-body model data 130b (step S102a). The generating unit 140b generates the object model data 130c (step S102b). Mote that the generating unit 140b may use object model data that has been generated in advance as the object model data 130c.

The generating unit 140b generates the synthetic model data in which plural human body models according to movement and the object model are combined (step S103). The generating unit 140b removes redundancy from the synthetic model table 130d (step S104).

The generating unit 140b registers the part-label image data and the depth image data in the learning image table 130e based on the synthetic model data (step S105).

The learning unit 140c of the learning device 100 refers to the learning image table 130e, and performs machine learning about a relationship between a feature of the depth image data and the part label, to generate the identifier data 130f (step S106). The notifying unit 140d of the learning device 100 notifies about the identifier data 130f to the identification device 200 (step S107).

Figure 11:
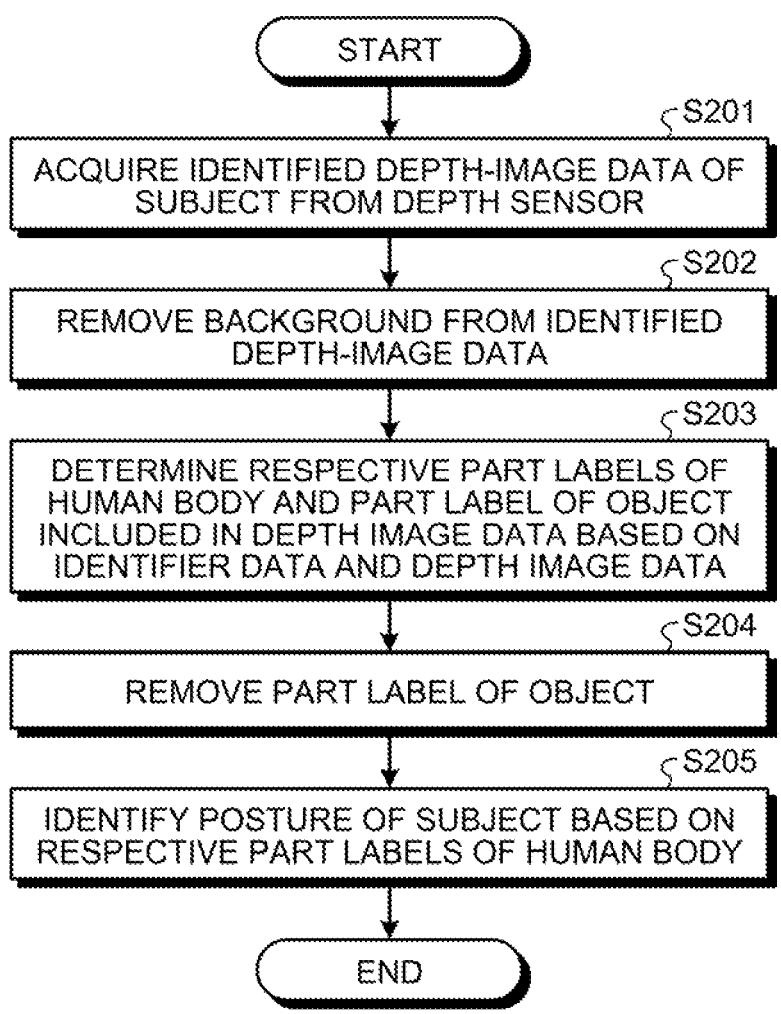
FIG. 11 is a flowchart illustrating a procedure of processing performed by the identification device according to the present embodiment.

FIG. 11 is a flowchart illustrating a procedure of the processing performed by the identification device according to the present embodiment. As illustrated in FIG. 11, the acquiring unit 240a of the identification device 200 acquires the identified depth-image data 230a from the depth sensor 20 (step S201).

The removing unit 240b of the identification device 200 removes a background from the identified depth-image data 230a (step S202). The determining unit 240c of the identification device 200 determines a part labels of the respective parts of the human body and the part label of the object included in the depth image data based on the identifier data 130f and the depth image data (step S203).

The identifying unit 240d of the identification device 200 removes the part label of the object (step S204) The identifying unit 240d identifies a posture of the subject based on the part labels of a human body (step S205).

Next, an effect of the learning device 100 and the identification device 200 according to the present embodiment will be described. The generating unit 140b of the learning device 100 generates plural learning images that are associated with the depth image data and the part label image, based on the synthetic model data in which the human-body model data 130b and the object model data 130c are combined. The learning device 100 generates the identifier data 130f in which a feature of the depth image data and a part label of the human body and the part label of the object are associated, by performing machine learning of plural learning images. Because this identifier data 130f is an identifier in which a feature of the depth image data and a part label of the human body or the part label of the object, even when the human body and the object are present at the same time when acquiring a depth image, the respective items can be distinguished from each other to be classified into the part label of the human body and the part label, of the object from the depth image data.

The identification device 200 determines part labels of the subject and the object by using the depth image data that is obtained by removing a background from the identified depth-image data 230a acquired from the depth sensor 20. Therefore, even when a human body and an object are included in the depth image data, respective items can be distinguished from each other to be classified into the part label of the human body and the part label of the object for the depth image data. That is, even when occlusion by an object occurs, accurate part recognition can be achieved.

The identification device 200 identifies a posture of a subject after removing the part label of the object from among the part labels of the human body and the part label of the object and, therefore, can identify a posture of the subject accurately.

It is noted that what has been described in the embodiment above is an example, and the processing of the learning device 100 and the identification device 200 is not limited to the processing described above. In the following, other processing 1 to 3 are described.

The other processing 1 will be described. In the above processing, the learning device 100 uses the object model of a pommel horse that is present at a fixed position as the object model data 130c, but it is not limited thereto. For example, an object that makes movement having a specific relation with a part of a human body can be used as an object model. For example, the generating unit 140b generates a three-dimensional model of a flying ring similarly to a pommel horse. When generating synthetic model data, the generating unit 140b moves the flying ring to a part of a hand of a human body model in a frame unit to arrange the flying ring at an accurate grabbing position based on an orientation of a hand (upward, downward, sideward, and the like). The generating unit 140b generates plural pieces of synthetic model data by repeating the above processing for every frame, and stores the data in the synthetic model table 130d. The other processing is similar to the processing described in the embodiment.

The other processing 2 will be described. In the above processing, the learning device 100 generates the identifier data 130f, and the identification device 200 identifies a posture of a subject by using the identifier data 130f, but it is not limited thereto. For example, a depth-image processing device that performs the processing of the learning device 100 and the identification device 200 may perform processing corresponding to the embodiment described above. For example, the depth-image processing device generates the identifier data 130f by performing the processing similar to that of the control unit 140 in FIG. 2 in a "learning phase". The depth-image processing device performs processing similar to that of the control unit 240 illustrated in FIG. 9 in an "identification phase" by using the identifier data 130f that, has been learned in the learning phase, to identify a posture of the subject.

The other processing 3 will be described. In FIG. 8, a method of identifying a part label by the binary tree is described, but the number of the binary tree may be more than one, or part label identification including an object from a depth image may be performed by deep learning, without using the binary tree.

Figure 12:
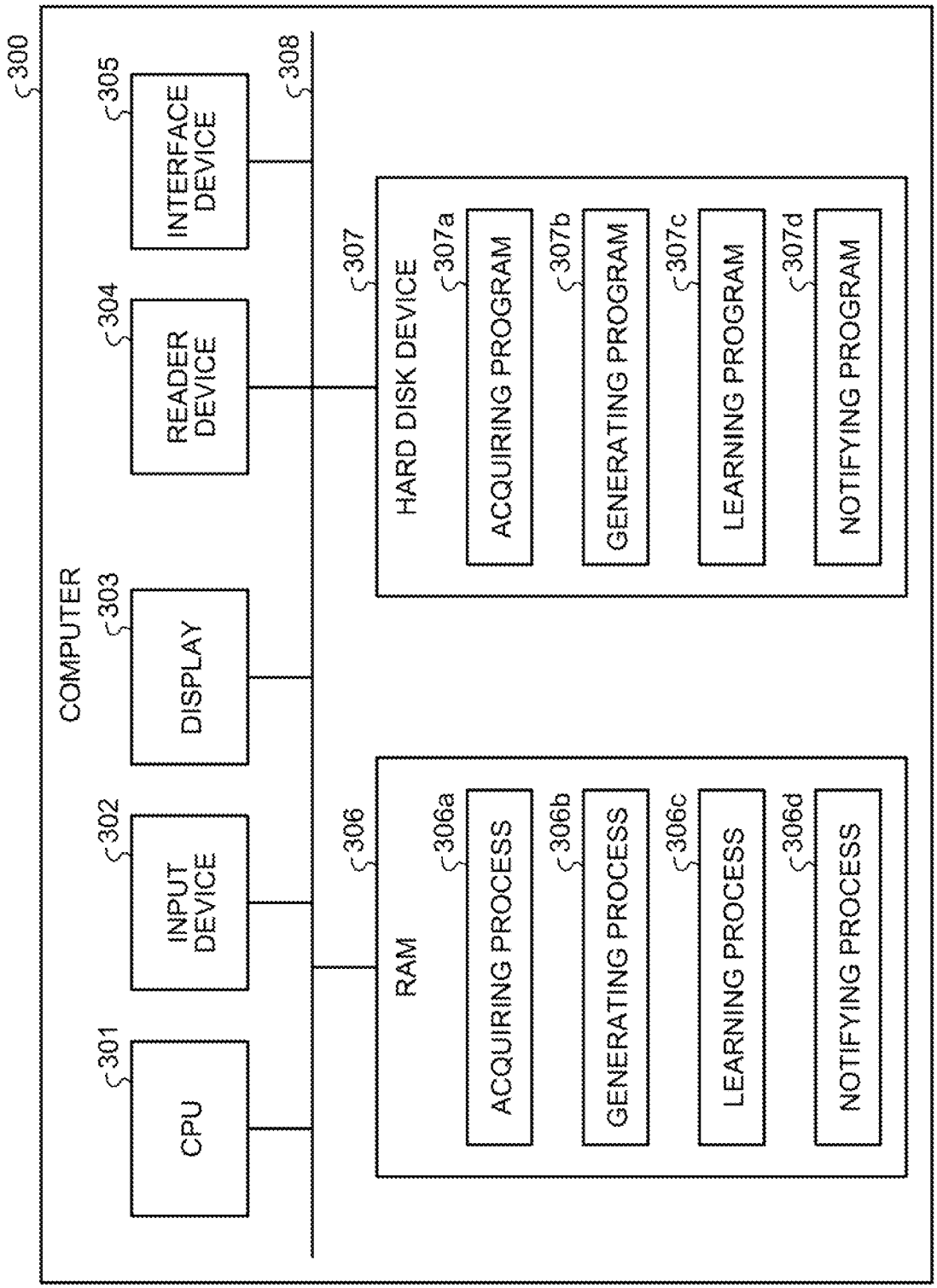
FIG. 12 is a diagram illustrating an example of a hardware configuration of a computer that implements functions similar to those of the learning device.

Next, an example of a hardware configuration of a computer that implements functions similar to those of the learning device 100 and the identification device 200 described in the above embodiment will be described. FIG. 12 is a diagram illustrating an example of a hardware configuration of the computer that implements functions similar to those of the learning device.

As illustrated in FIG. 12, a computer 300 includes a CPU 301 that performs various kinds of arithmetic processing, an input device 302 that accepts an input of data from a user, and a display unit 303. Moreover, the computer 300 includes a reader device 304 that reads a program and the like from a storage medium, and an interface device 305 that communicates data with another computer (the motion capture device 10, and the like) through a wired or wireless network. Furthermore, the computer 300 includes a RAM 306 that temporarily stores various kinds of information, and a hard disk device 307. The respective devices 301 to 307 are connected to a bus 308.

The hard disk device 307 has an acquiring program 307a, a generating program 307b, a learning program 307c, and a notifying program 307d. The CPU 301 reads the acquiring program 307a, the generating program 307b, the learning program 307c, and the notifying program 307d and develop them in the RAM 306.

The acquiring program 307a functions as an acquiring process 306a. The generating program 307b functions as a generating process 306b. The learning program 307c functions as a learning process 306c. The notifying program 307d functions as a notifying process 306d.

Processing of the acquiring process 306a corresponds to the processing of the acquiring unit 140a. Processing of the generating process 306b corresponds to the processing of the generating unit 140b. Processing of the learning process 306c corresponds to the processing of the learning unit 140c. Processing of the notifying process 306d corresponds to the processing of the notifying unit 140d.

Note that the respective programs 307a to 307d are not necessarily requested to be stored in the hard disk device 307 from the beginning. For example, the respective programs are stored in a "portable physical medium", such as a flexible disk (FD), a CD-ROM, a DVD disk, a magneto optical disk, and an IC card, to be inserted to the computer 300. The computer 300 may be configured to read and execute the respective programs 307a to 307d.

Figure 13:
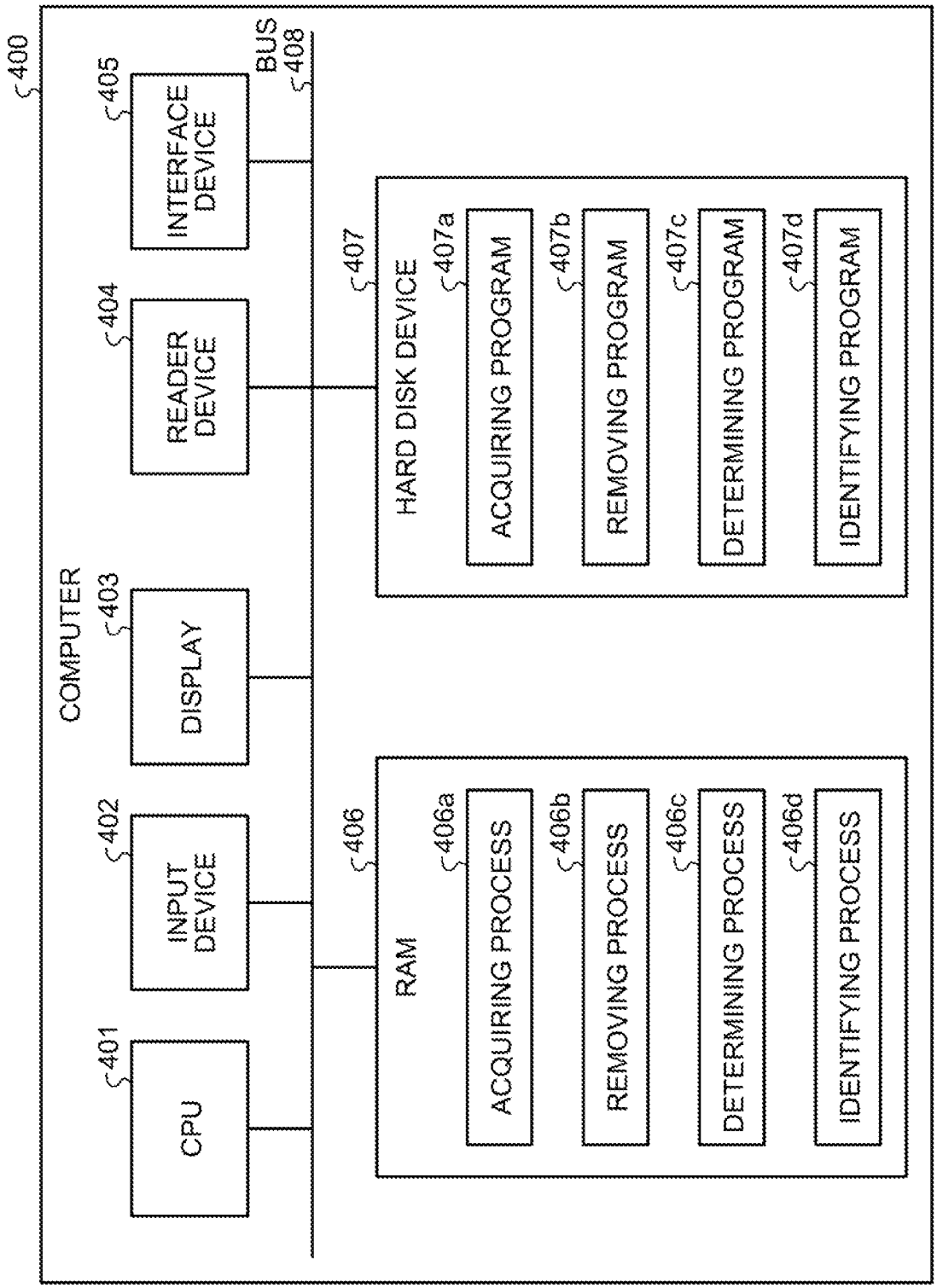
FIG. 13 is a diagram illustrating an example of a hardware configuration of a computer that implements functions similar to those of the identification device.

FIG. 13 is a diagram illustrating an example of a hardware configuration of a computer that implements functions similar to those of the identification device.

As illustrated in FIG. 13, a computer 400 includes a CPU 301 that performs various kinds of arithmetic processing, an input device 402 that accepts an input of data from a user, and a display 403. Moreover, the computer 400 includes a reader device 404 that reads a program and the like from a storage medium, and an interface device 405 that communicates data with another computer (the motion capture device 10, and the like) through a wired or wireless network. Furthermore, the computer 400 includes a RAM 406 that temporarily stores various kinds of information, and a hard disk device 407. The respective devices 401 to 407 are connected to a bus 408.

The hard disk device 407 includes an acquiring program 407a, a removing program 407b, a determining program 407c, and an identifying program 407d. The CPU 401 reads the acquiring program 407a, the removing program 407b, the determining program 407c, and the identifying program 407d, and develops them in the RAM 406.

The acquiring program 407a functions as an acquiring process 406a. The removing program 407b functions as a removing process 406b. The determining program 407c functions as a determining process 406c. The identifying program 407d functions as an identifying process 406d.

Processing of then acquiring process 406a corresponds to the processing of the acquiring unit 240a. Processing of the removing process 406b corresponds to the processing of the removing unit 240b. Processing of the determining process 406c corresponds to the processing of the determining unit 240c. Processing of the identifying process 406d corresponds to the processing of the identifying unit 240d.

Note that the respective programs 407a to 407d are not necessarily requested to be stored in the hard disk device 407 from the beginning. For example, the respective programs are stored in a "portable physical medium", such as a flexible disk (FD), a CD-ROM, a DVD disk, a magneto optical disk, and an IC card, to be inserted to the computer 400. The computer 400 may be configured to read and execute the respective programs 407a to 407d.

The present invention enables to determine a part of a human body appropriately.

All examples and conditional language provided herein are intended for the pedagogical purposes of aiding the reader in understanding the invention and the concepts contributed by the inventors to further the art, and are not to be construed as limitations to such specifically recited, examples and condition nor does the organization of such examples in the specification relate to a showing of the superiority and inferiority of the invention. Although one or more embodiments of the present invention have been described in detail, it should be understood that have various changes, substitutions, and alterations could be made hereto without departing from the spirit and scope of the invention.

What is claimed is:

1. A depth-image processing device comprising:
a memory; and
a processor coupled to the memory and configured to:
generate, based on a synthetic model in which a three-dimensional model of a human body and a three-dimensional model of an object are combined, a plurality of learning images in which a depth image that indicates a distance from a reference position to respective positions on the human body in the synthetic model and to respective positions on the object, and a part label image to identify respective parts of the human body in the synthetic model and a part of the object by indicating with unique part labels are associated with each other, acquire a depth image including subject, an object, and a background from a depth sensor, generate a subject depth image by removing the background from the depth image including the subject, the object, and the background, and determine a relationship between a position of the subject depth image and any one of a part of the human body and a part of the object based on the subject depth image and the identifier, and learn an identifier in which a feature of the depth image and any one of a part of the human body and a part of the object are associated with each other, based on the learning images.

2. The depth-image processing device according to claim 1, wherein the processor is further configured to:

identify respective parts of the human body included in the subject depth image based on a determination result at determining of the relationship, and identify a posture of the subject based on another relationship among the respective parts except the part of the object.

3. A depth-image processing system comprising:
a learning device; and
an identification device, wherein
the learning device includes
  a first memory, and
  a first processor coupled to the first memory and configured to:
    generate, based on a synthetic model in which a three-dimensional model of a human body and a three-dimensional model of an object are combined, a plurality of learning images in which a depth image that indicates a distance from a reference position to respective positions on the human body or to respective positions on the object, and a part image to identify any one of respective parts of the human body and a part of the object are associated with each other, and
    learn an identifier in which a feature of the depth image and any one of a part of the human body and a part of the object are associated with each other, based on the learning images, and
the identification device includes
  a second memory, and
  a second processor coupled to the second memory and configured to:
    acquire a depth image including subject and a background from a depth sensor,
    generate a subject depth image by removing the background from the depth image including the subject and the background, and
    determine a relationship between a position of the subject depth image and any one of a part of the human body and a part of the object based on the subject depth image and the identifier.

4. A depth-image processing method executed by a processor, the depth-image processing method comprising:

generating, based on a synthetic model in which a three-dimensional model of a human body and a three-dimensional model of an object are combined, a plurality of learning images in which a depth image that indicates a distance from a reference position to respective positions on the human body in the synthetic model and to respective positions on the object, and a part label image to identify respective parts of the human body in the synthetic model and a part of the object by indicating with unique part labels are associated with each other, acquiring a depth image including subject, an object, and a background from a depth sensor, generating a subject depth image by removing the background from the depth image including the subject, the object, and the background, and determining a relationship between a position of the subject depth image and any one of a part of the human body and a part of the object based on the subject depth image and the identifier, and learning an identifier in which a feature of the depth image and any one of a part of the human body and a part of the object are associated with each other, based on the learning images.

5. The depth-image processing method according to claim 4, further including:

identifying respective parts of the human body included in the subject depth image based on a determination result at the determining of the relationship, and identifying a posture of the subject based on another relationship among the respective parts except the part of the object.

6. A non-transitory computer-readable recording medium storing therein a depth-image processing program that causes a computer to execute a process, the process comprising:

generating, based on a synthetic model in which a three-dimensional model of a human body and a three-dimensional model of an object are combined, a plurality of learning images in which a depth image that indicates a distance from a reference position to respective positions on the human body in the synthetic model and to respective positions on the object, and a part label image to identify respective parts of the human body in the synthetic model and a part of the object by indicating with unique part labels are associated with each other, acquiring a depth image including subject, an object, and a background from a depth sensor, generating a subject depth image by removing the background from the depth image including the subject, the object, and the background, and determining a relationship between a position of the subject depth image and any one of a part of the human body and a part of the object based on the subject depth image and the identifier, and learning an identifier in which a feature of the depth image and any one of a part of the human body and a part of the object are associated with each other, based on the learning images.

7. The non-transitory computer-readable recording medium according to claim 6, wherein the process further includes:

identifying respective parts of the human body included in the subject depth image based on a determination result at the determining of the relationship, and identifying a posture of the subject based on another relationship among the respective parts except the part of the object.

\* \* \* \* \*